(12) United States Patent
Kondo et al.

(10) Patent No.: US 12,391,521 B2
(45) Date of Patent: Aug. 19, 2025

(54) ELEVATOR AND CONTROL METHOD FOR ELEVATOR

(71) Applicant: Hitachi, Ltd., Tokyo (JP)

(72) Inventors: Takeshi Kondo, Tokyo (JP); Shinsuke Inoue, Tokyo (JP); Naoto Ohnuma, Tokyo (JP); Yasutaka Suzuki, Tokyo (JP); Kohichiroh Ide, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1129 days.

(21) Appl. No.: 17/294,855

(22) PCT Filed: Oct. 17, 2019

(86) PCT No.: PCT/JP2019/040944
§ 371 (c)(1),
(2) Date: May 18, 2021

(87) PCT Pub. No.: WO2020/170503
PCT Pub. Date: Aug. 27, 2020

(65) Prior Publication Data
US 2022/0024720 A1    Jan. 27, 2022

(30) Foreign Application Priority Data

Feb. 20, 2019    (JP) ................ 2019-028498

(51) Int. Cl.
*B66B 5/02*    (2006.01)
*B66B 1/32*    (2006.01)
(Continued)

(52) U.S. Cl.
CPC .............. *B66B 5/16* (2013.01); *B66B 1/32* (2013.01); *B66B 5/06* (2013.01); *H02J 7/0013* (2013.01); *H02J 7/0048* (2020.01); *H02J 9/06* (2013.01)

(58) Field of Classification Search
CPC ..... B66B 5/16; B66B 1/32; B66B 5/06; H02J 7/0013; H02J 9/06; H02J 7/0048
See application file for complete search history.

(56) References Cited

U.S. PATENT DOCUMENTS 7,703,578 B2 *    4/2010  Kugiya ............... B66B 5/12
                                                            187/390
2012/0137923 A1 *   6/2012  Hepner ............... B61B 13/04
                                                            105/141
(Continued)

FOREIGN PATENT DOCUMENTS

CN    107108154 A  *  8/2017  ........... B66B 5/0006
JP    11-79593 A       3/1999
(Continued)

OTHER PUBLICATIONS

English Translation JP-2011121742-A (Year: 2011).*
(Continued)

*Primary Examiner* — Shafiq Mian
(74) *Attorney, Agent, or Firm* — Crowell & Moring LLP

(57) ABSTRACT

An elevator according to an aspect of the present invention includes a car speed detection device that measures car speed, an emergency braking device that comes into press contact with a guiderail and emergently stops a car when the car speed exceeds a threshold, an electric actuating unit that electrically actuates the emergency braking device, a battery that supplies electric power when commercial power supply is interrupted, and a safety control unit that monitors abnormality of the elevator and controls operation of the electric actuating unit. The safety control unit measures remaining power of the battery when the electric power is supplied from the battery, determines operation propriety of the emergency braking device at commercial power supply restoration time based on transition of battery remaining
(Continued)

power, and controls operation of the electric actuating unit at the commercial power supply restoration time based on content of the determination.

10 Claims, 10 Drawing Sheets

(51) Int. Cl.
  *B66B 5/06* (2006.01)
  *B66B 5/16* (2006.01)
  *H02J 7/00* (2006.01)
  *H02J 9/06* (2006.01)

(56) References Cited

U.S. PATENT DOCUMENTS

| 2016/0122158 A1* | 5/2016 | Shapira | B66B 1/302 |
| | | | 187/250 |
| 2018/0237263 A1 | 8/2018 | Fargo | |

FOREIGN PATENT DOCUMENTS

| JP | 2005-105647 A | | 4/2005 |
| JP | 2010-208779 A | | 9/2010 |
| JP | 2011-105412 A | | 6/2011 |
| JP | 2011121742 A | * | 6/2011 |
| JP | 5320422 B2 | | 10/2013 |
| JP | 2017178598 A | * | 10/2017 |

OTHER PUBLICATIONS

English Translation JP-2017178598-A (Year: 2017).*
English Translation CN-107108154-A (Year: 2017).*
International Search Report (PCT/ISA/210) issued in PCT Application No. PCT/JP2019/040944 dated Jan. 21, 2020 with English translation (five (5) pages).
Japanese-language Written Opinion (PCT/ISA/237) issued in PCT Application No. PCT/JP2019/040944 dated Jan. 21, 2020 (three (3) pages).
Japanese-language Office Action issued in Japanese Application No. 2019-028498 dated Nov. 21, 2022 with English translation (six (6) pages).
Chinese-language Office Action issued in Chinese Application No. 201980075855.1 dated May 17, 2022 with partial English translation (nine (9) pages).
Extended European Search Report issued in European Application No. 19916519.2 dated Oct. 10, 2022 (nine (9) pages).

* cited by examiner

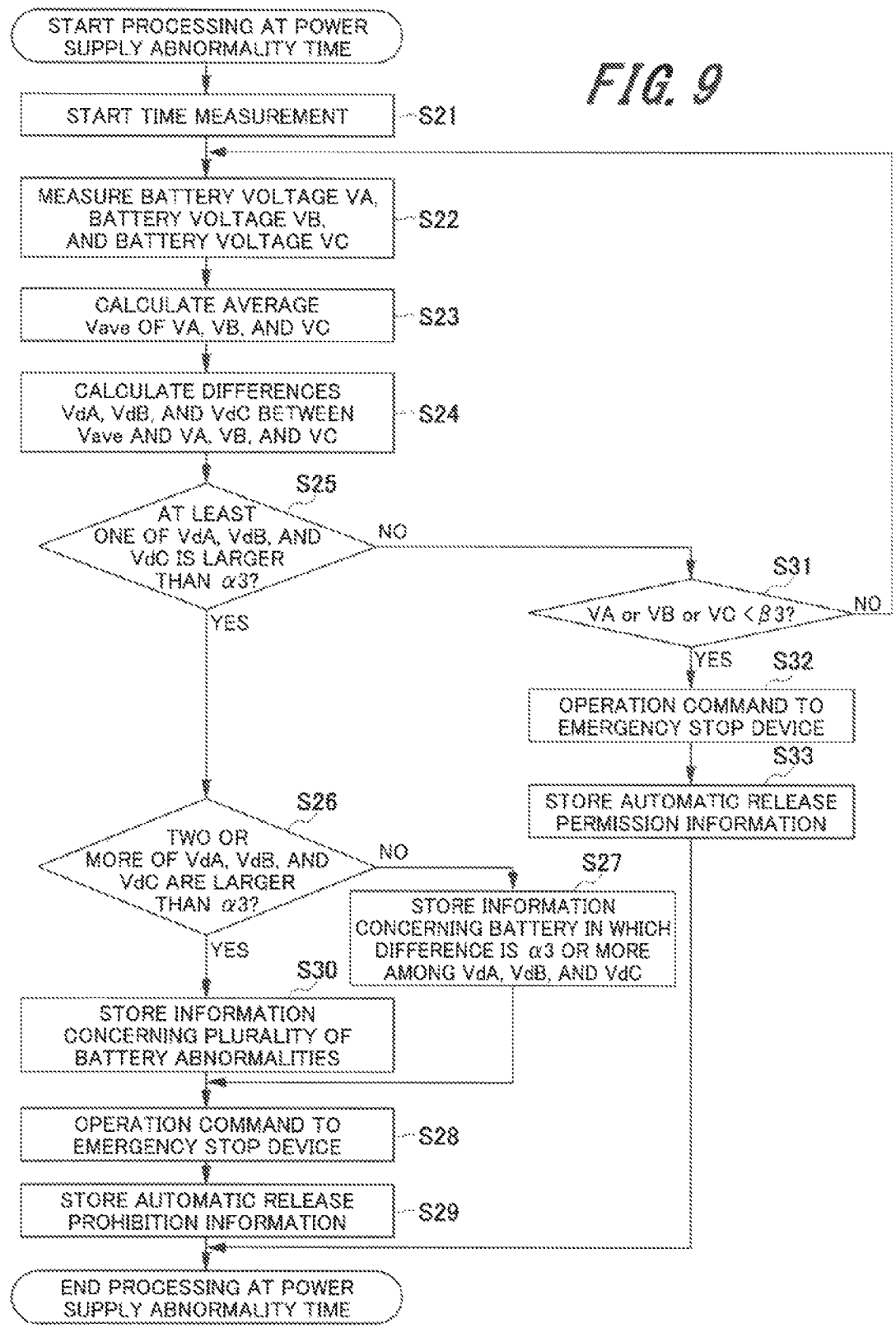

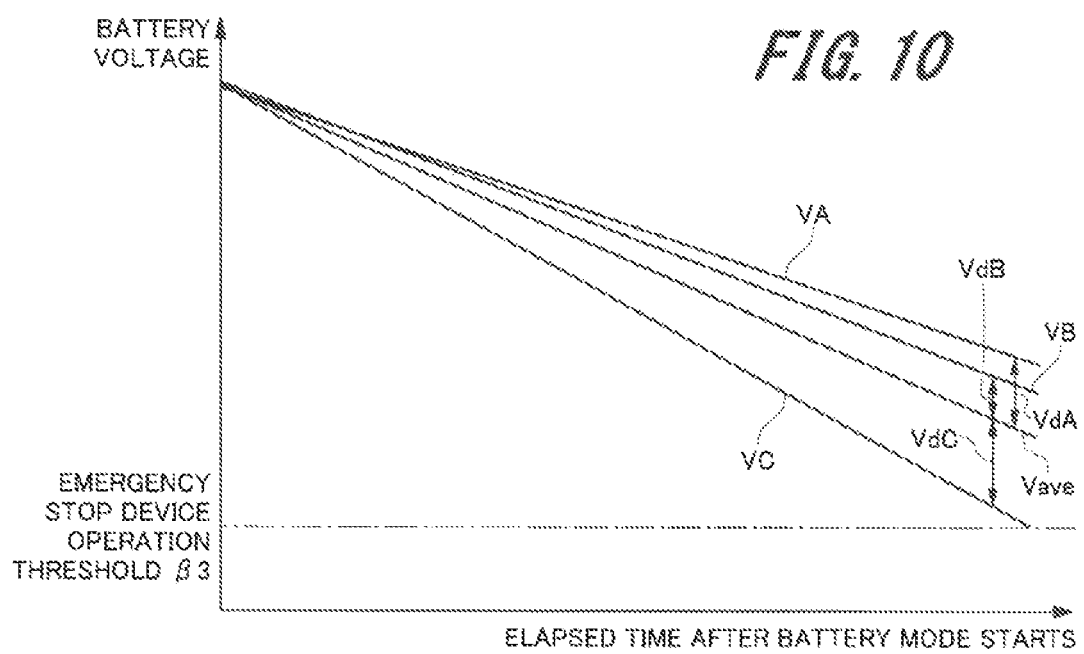

ELEVATOR AND CONTROL METHOD FOR ELEVATOR

TECHNICAL FIELD

The present invention relates to an elevator including an emergency braking device and a control method for the elevator.

BACKGROUND ART

In an elevator, an emergency braking device called an emergency stop device is attached to a car in order to automatically stop the car even when the car freely falls because of main rope fracture or the like. When car speed increases and exceeds a set threshold, a braking mechanism included in the emergency stop device strongly grips (compresses) a guiderail in a shaft to thereby emergently brake the car.

An actuating unit for causing the emergency stop device to start the gripping of the guiderail has been a mechanical unit, called governor rope, using a long object coupled to the car. On the other hand, there is a method of causing the emergency stop device to operate by an electric actuating unit. In this case, the braking mechanism of the emergency stop device operates when a power supply of the electric actuating unit is interrupted. Accordingly, when power supply abnormality such as a power failure (supply interruption of a commercial power supply) occurs, it is conceivable that the emergency stop device operates, although electric power is not supplied to the electric actuating unit and the car has not reached abnormal speed. Since the emergency stop device is the emergency braking device that prevents a fall of the car, it is not easy to restore the emergency stop device from a braking state once the emergency stop device operates. A problem thus occurs in that the elevator cannot rise and fall until an operator works in the site.

For example, Patent Literature 1 discloses a technique for stopping a car on the closest floor using a battery when a power failure occurs and causing an emergency stop device to operate and storing operation information of the car immediately before the power failure and, at restoration time from the power failure, restoring the car to a state of normal operation based on the stored operation information (see, for example, Patent Literature 1).

CITATION LIST

Patent Literature

Patent Literature 1: JP 2005-105647 A1

SUMMARY OF INVENTION

Technical Problem

In an elevator device described in Patent Literature 1, a storing unit that stores operation information including position information of the car is provided. After the power failure ends, operation is resumed based on the operation information stored in the storing unit. That is, the elevator device automatically performs release of the emergency stop device based on the operation information stored at the power failure.

However, the elevator device described in Patent Literature 1 is not adapted to an event in which electric power is not supplied because of a power supply failure other than the power failure such as disconnection of a power supply line or abnormality of a battery. It is conceivable that, even when such power supply abnormality occurs, the electric actuating unit automatically releases the emergency stop device if the power supply to the electric actuating unit is restored. Therefore, the emergency stop device may operate again after the automatic release. There is thus a concern that an elevator unusable time increases.

The present invention has been devised in view of the above circumstances, and an object of the present invention is to reduce an elevator unusable time after power supply restoration.

Solution to Problem

In order to solve the problems described above, an elevator according to an aspect of the present invention includes: a car lifted and lowered along a guiderail on an inside of a shaft; a car speed detection device that measures moving speed of the car; an emergency stop device provided in the car and including a braking mechanism configured to be capable of coming into press contact with the guiderail and emergently stopping the car when the moving speed of the car exceeds a threshold; an electric actuating unit that actuates the emergency stop device using electricity according to an operation command; a battery that supplies electric power when supply of commercial power supply to the elevator is interrupted; and a safety control unit that monitors abnormality of the elevator and controls operation of the electric actuating unit. The safety control unit measures remaining power of the battery when the supply of the commercial power supply is interrupted and the electric power is supplied from the battery, determines operation propriety of the emergency stop device at commercial power supply restoration time based on transition of the remaining power of the battery, and controls operation of the electric actuating unit at the commercial power supply restoration time based on content of the determination.

Advantageous Effects of Invention

According to at least one aspect of the present invention, it is possible to reduce an elevator unusable time after power supply restoration.

Problems, configurations, and effects other than those described above are clarified by the following explanation of an embodiment.

BRIEF DESCRIPTION OF DRAWINGS

FIG. 9 is a flowchart for explaining the operation of an emergency stop device at power supply abnormality time according to the third embodiment of the present invention.

FIG. 10 is a transition diagram of battery remaining power for explaining abnormality determination for a battery according to the third embodiment of the present invention.

DESCRIPTION OF EMBODIMENTS

Figure 1:
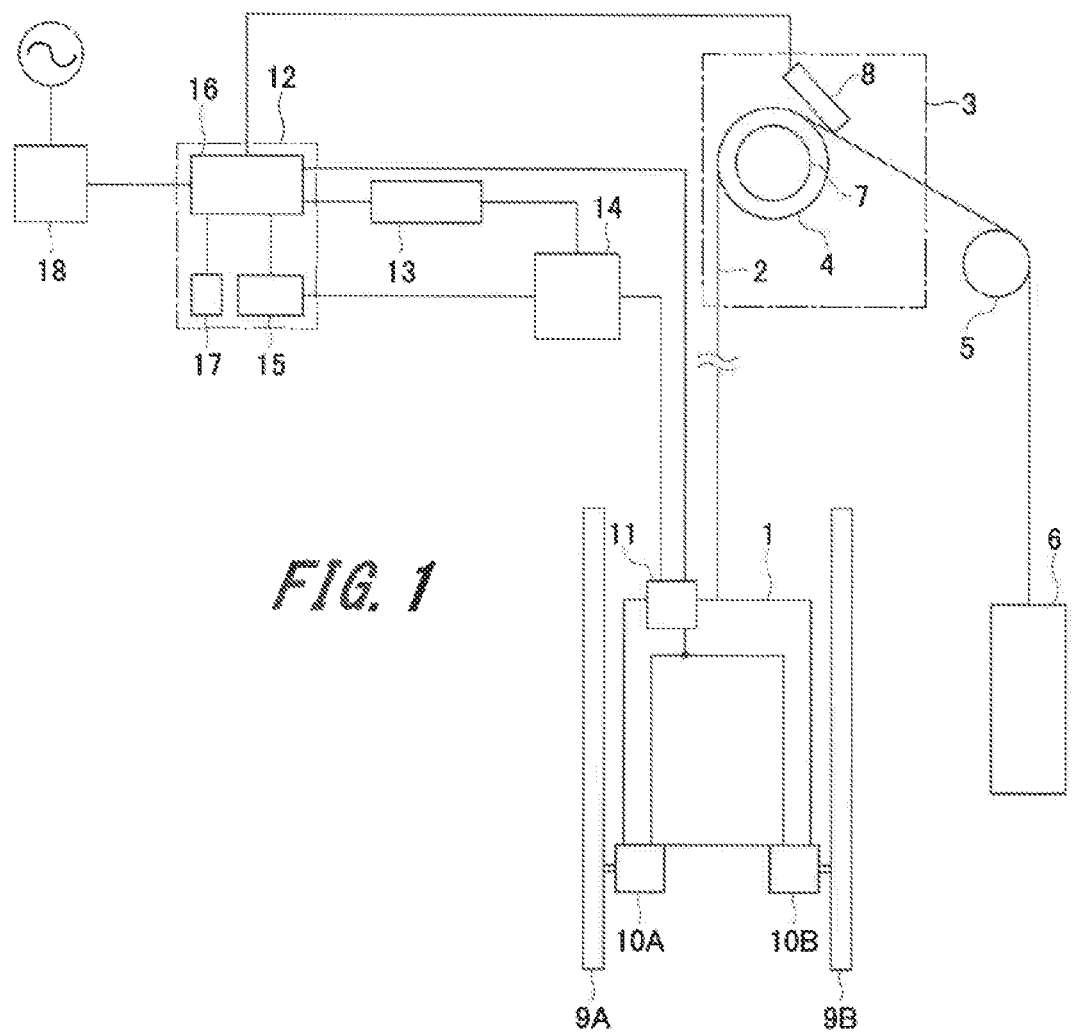
FIG. 1 is a schematic diagram illustrating an overall configuration example of an elevator according to a first embodiment of the present invention.

Examples of modes for carrying out the present invention (hereinafter described as "embodiments") are explained below with reference to the accompanying drawings. In this specification and the accompanying drawings, components having substantially the same functions or configurations are denoted by the same reference numerals and signs and redundant explanation of the components is omitted.

In the present invention, in an elevator including an emergency stop device that is actuated by an electric actuating unit, automatic release propriety of the emergency stop device is determined during occurrence of power supply abnormality (for example, supply interruption of a commercial power supply), and, only when automatic release of the emergency stop device is permitted, the emergency stop device is automatically released at power supply restoration time.

1. First Embodiment

First, an elevator according to a first embodiment of the present invention is explained. FIG. 1 is a schematic diagram illustrating an overall configuration example of an elevator 20 according to the first embodiment.

In FIG. 1, a car 1 is suspended by a main rope 2 and coupled to a balance weight 6 via a sheave 4 and a pulley 5 configuring a winding machine 3. The winding machine 3 includes a motor 7 and a winding machine brake 8. When rotation torque of the motor 7 is controlled, the car 1 moves along guiderails 9A and 9B on the inside of a not-illustrated shaft.

When the elevator 20 lands on a floor where passengers get on and off or when a safety device in the shaft operates, the winding machine brake 8 suppresses a rotational motion of the winding machine 3 to brake the car 1.

On the other hand, emergency stop devices 10A and 10B, which are braking devices independent from the winding machine brake 8, are attached to the car 1. The emergency stop devices 10A and 10B each include braking mechanisms (details are omitted) configured to be capable of coming into press contact with the guiderails 9A and 9B and emergently stopping the car 1 when moving speed of the car 1 exceeds a threshold. The emergency stop devices 10A and 10B can emergently brake the car 1 with the braking mechanisms even in an emergent state that the winding machine brake 8 cannot cope with, for example, when the main rope 2 fractures and the car 1 drops. When the emergency stop devices 10A and 10B operate, the braking mechanisms directly grip the guiderails 9A and 9B and come into a state in which braking mechanisms are in press contact with the guiderails 9A and 9B, whereby the car 1 stops.

In this specification, "release" refers to the state where the braking mechanisms of the emergency stop devices 10A and 10B do not grip the guiderails 9A and 9B. When the emergency stop devices 10A and 10B are released, the braking mechanisms come into a state in which the braking mechanisms do not grip the guiderails 9A and 9B and are not in press contact with the guiderails 9A and 9B. In the following explanation, when emergency stop devices 10A and 10B are not distinguished or are collectively referred to, the emergency stop devices 10A and 10B are referred to as "emergency stop device 10". When the guiderails 9A and 9B are not distinguished or are collectively referred to, the guiderails 9A and 9B are referred to as "guiderail 9".

An electric actuating unit 11 is attached to the car 1 and actuates the emergency stop device 10 using electricity according to an operation command. The electric actuating unit 11 receives an operation command from a safety control unit 12 and interrupts energization of, for example, a solenoid to actuate the braking mechanism of the emergency stop device 10 (cause the braking mechanism to grip the guiderail 9). The electric actuating unit 11 has a function of detecting that the operation of the emergency stop device 10 is completed or a function of receiving, from the emergency stop device 10, a signal indicating that a braking operation is completed.

A car speed detection device 13 is a device that detects moving speed of the car 1 and outputs the moving speed to the safety control unit 12. As the car speed detection device 13, for example, a camera sensor, an optical sensor, a barcode sensor, and a magnetic sensor may be used as long as the sensors can detect the moving speed of the car 1. The car speed detection device 13 acquires information of one or a plurality of reading target objects set on the car side using these sensors and analyzes the acquired information to calculate car speed. For example, a scheme for calculating moving speed from a moving distance or acceleration per set time of the car 1 may be adopted.

The safety control unit 12 monitors a state of the elevator 20 and controls the operation of the winding machine brake 8 and the electric actuating unit 11 based on the state of the elevator 20. For example, the safety control unit 12 measures remaining power of a battery 14 when supply of a commercial power supply is interrupted and electric power is supplied from the battery 14 and determines operation propriety for the emergency stop device 10 at commercial power supply restoration time based on transition of the remaining power of the battery 14. The safety control unit 12 controls operation of the electric actuating unit 11 at the commercial power supply restoration time based on content of the determination (corresponding to emergency stop device automatic release information). The emergency stop device automatic release information representing the content of the determination is information for prohibiting or permitting the braking mechanism of the emergency stop device 10 from automatically releasing or to automatically release a state in which the braking mechanism is in press contact with the guiderail 9 at the commercial power supply restoration time (automatic release).

In this embodiment, the safety control unit 12 includes a battery-remaining-power measuring unit 15, a safety determining unit 16, and a storing unit 17. The safety control unit 12 includes a not-illustrated analog-to-digital conversion circuit and a not-illustrated digital-to-analog conversion circuit. When electric power is supplied from the battery 14, the battery-remaining-power measuring unit 15 measures remaining power of the battery 14 as time elapses.

The safety determining unit 16 performs abnormality determination for the elevator 20 and outputs, based on a determination result, an operation command to the winding machine brake 8 and the electric actuating unit 11. For example, the safety determining unit 16 determines, based on transition of the remaining power of the battery 14 measured by the battery-remaining-power measuring unit 15, whether abnormality is present in the battery 14.

When determining that abnormality is present in the battery 14, the safety determining unit 16 stores automatic release prohibition information in the storing unit 17 as determination content of operation propriety of the emergency stop device 10 at the commercial power supply restoration time. The automatic release prohibition information is information for prohibiting the braking mechanism of the emergency stop device 10 from automatically releasing, at the commercial power supply restoration time, a state in which the braking mechanism is in press contact with the guiderail 9 (automatic release). On the other hand, when determining that abnormality is absent in the battery 14, the safety determining unit 16 stores automatic release permission information in the storing unit 17 as determination content of operation propriety of the emergency stop device 10 at the commercial power supply restoration time. The automatic release permission information is information for permitting the braking mechanism of the emergency stop device 10 to automatically release, at the commercial power supply restoration time, a state in which the braking mechanism is in press contact with the guiderail 9 (automatic release). The safety determining unit 16 confirms, at the commercial power supply restoration time, the automatic release prohibition information or the automatic release permission information stored in the storing unit 17 and controls the electric actuating unit 11.

The storing unit 17 stores emergency stop device automatic release information (the automatic release prohibition information or the automatic release permission information), which is determination content of operation propriety for the emergency stop device 10 at the commercial power supply restoration time. Examples of the storing unit 17 include a nonvolatile memory such as a flash memory.

A monitoring unit 18 is set in, for example, the shaft and transmits information output by the safety control unit 12 to an external control center. As means for supplying electric power to the monitoring unit 18 at interruption time of the commercial power supply, the battery 14 may be used. A dedicated battery (not illustrated) for supplying electric power to the monitoring unit 18 may be separately provided.

The battery 14 is a power supply for supplying electric power to the electric actuating unit 11, the safety control unit 12, and the car speed detection device 13 when the supply of the commercial power supply to the elevator 20 is interrupted because, for example, abnormality occurs in the commercial power supply. When the commercial power supply is supplied to the elevator 20, the battery 14 is charged. Examples of a type of the battery 14 include a lithium ion battery and a lead storage battery.

When the commercial power supply of the elevator 20 is interrupted because of some abnormality, the power supply by the battery 14 is started. At this time, the safety control unit 12 detects that the electric power is supplied from the battery 14 and transitions from a "normal mode" for using the commercial power supply to a "battery mode". The battery mode may be determined by, for example, monitoring a voltage at a commercial power supply input terminal provided in the safety control unit 12 or may be determined by detecting in the battery-remaining-power measuring unit 15 that the power of the battery 14 decreases by a predetermined charging amount from a full charge state.

Note that the electric actuating unit 11 is configured to operate before the power supply to the car speed detection device 13 and the safety control unit 12 from the battery 14 is interrupted. For example, when battery remaining power runs short, first, a power supply of the electric actuating unit 11 is turned off and, subsequently, power supplies are turned off in the order of the car speed detection device 13 and the safety control unit 12. The safety control unit 12 (the safety determining unit 16) is configured to be able to detect, using a well-known technique, that the power supplies of the electric actuating unit 11 and the car speed detection device 13 are turned off. Consequently, the safety control unit 12 is capable of using, as a material for determining that the battery remaining power is exhausted, power-off of other devices.

When transitioning to the battery mode, the elevator 20 performs a closest floor landing operation. As electric power for closest floor landing operation, electric power of a battery for motor driving (not illustrated) may be used or the electric power of the battery 14 may be used. After the car 1 stops on the closest floor, a not-illustrated car door and a not-illustrated hall door are opened to let passengers off. The elevator 20 then comes into a pause state. The operation of the emergency stop device 10 after the car 1 pauses on the closest floor in the battery mode is explained below.

[Hardware Configuration of the Safety Control Unit]

Figure 2:
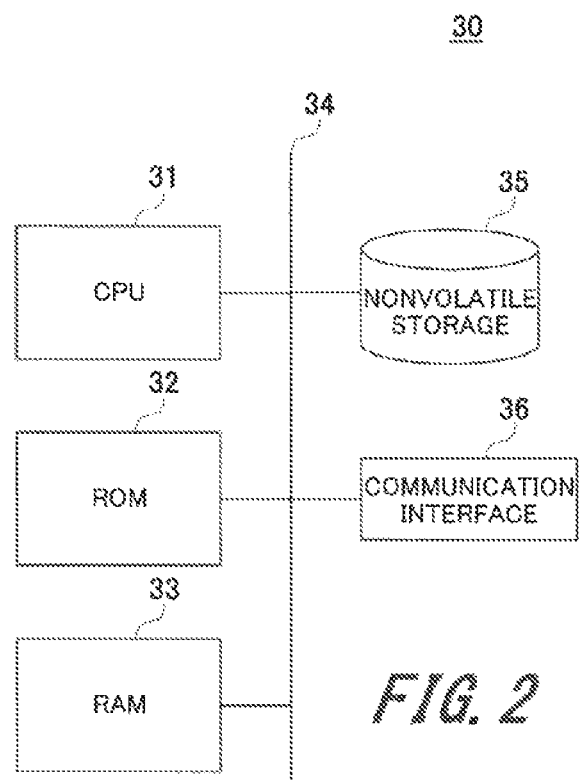
FIG. 2 is a block diagram illustrating a hardware configuration example of a computer used as a safety control unit according to the first embodiment of the present invention.

Subsequently, a hardware configuration example of the safety control unit 12 is explained. FIG. 2 is a block diagram illustrating a hardware configuration example of a computer 30 used as the safety control unit 12.

The computer 30 includes a Central Processing Unit (CPU) 31, a Read Only Memory (ROM) 32, a Random Access Memory (RAM) 33, a nonvolatile storage 35, and a communication interface 36 connected to one another via a system bus 34.

The CPU 31, the ROM 32, and the RAM 33 configure a control unit. The control unit is used as an example of a computer that controls the operation of the entire elevator 20 or the units of the elevator 20. The CPU 31 reads out, from the ROM 32, a program code of software for realizing functions according to this embodiment and executes the program code and performs control of the units and various arithmetic operations. Note that another arithmetic processing device such as a Micro Processing Unit (MPU) may be used instead of the CPU 31.

The ROM 32 is a nonvolatile memory. A program, data, and the like necessary for the CPU 31 to operate are stored in the ROM 32. The RAM 33 is used as an example of a volatile memory. Variables, parameters, and the like generated during arithmetic processing by the CPU 31 are temporarily stored in the RAM 33.

The nonvolatile storage 35 is an example of a nonvolatile memory and is capable of saving programs such as an Operating System (OS), parameters used when the programs are executed, data obtained by executing the programs, and the like. For example, in the nonvolatile storage 35, information on a battery remaining power characteristic and various thresholds are stored. A program to be executed by the CPU 31 may be stored in the nonvolatile storage 35. As the nonvolatile storage 35, a semiconductor memory, a hard disk, a Solid State Drive (SSD), a recording medium that makes use of magnetism or light, or the like is used. Note that the program may be provided via a wired or wireless transmission medium such as a local area network (LAN), the Internet, or a digital satellite broadcast.

As the communication interface 36, for example, a Network Interface Card (NIC) or a modem is used. The communication interface 36 is configured to be capable of transmitting and receiving various data to and from an external device using a network such as a LAN, a leased line, or the like to which a terminal is connected.

Note that, as a hardware configuration of the monitoring unit 18, the same configuration as the configuration of the computer 30 can be applied.

[Operation of the Emergency Stop Device]

Figure 3:
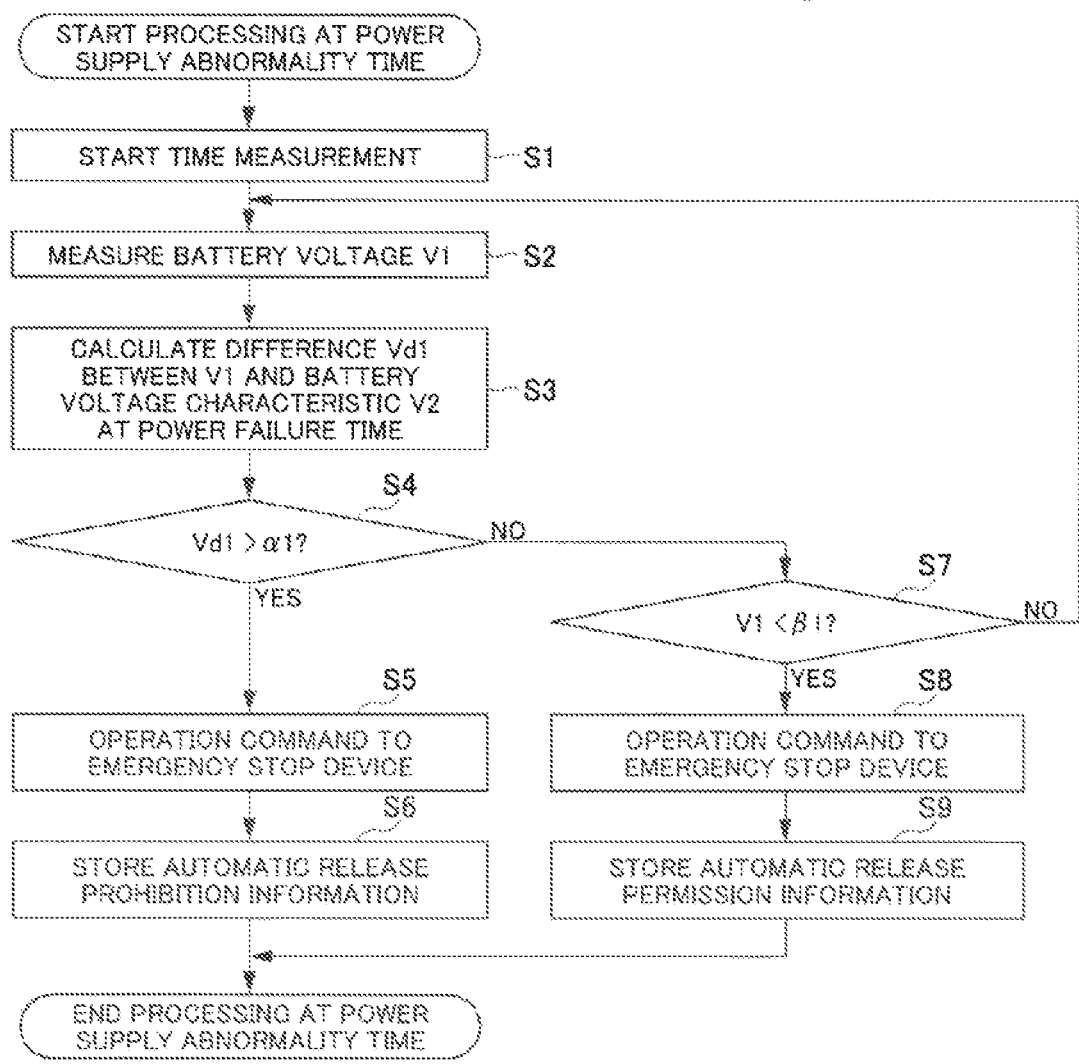
FIG. 3 is a flowchart for explaining the operation of an emergency stop device at power supply abnormality time according to the first embodiment of the present invention.

Subsequently, the operation of the emergency stop device 10 after the car 1 pauses on the closest floor in the battery mode is explained with reference to FIG. 3 and FIG. 4. FIG. 3 is a flowchart for explaining the operation of the emergency stop device 10 at power supply abnormality time according to the first embodiment.

When transitioning to the battery mode, the safety control unit 12 starts measurement of an elapsed time after the transition to the battery mode (S1). The elapsed time may be measured by the safety determining unit 16. For the measurement of the elapsed time, a not-illustrated counter circuit in the safety control unit 12 may be used or a time measuring unit (not illustrated) may be set as an external circuit.

During the battery mode, the battery-remaining-power measuring unit 15 measures remaining power of the battery 14 at every fixed period (S2). As a method of measuring the battery remaining power, for example, a publicly-known measurement technique for measuring, for example, a terminal voltage of the battery 14 may be used. In this embodiment, the terminal voltage of the battery 14 (hereinafter referred to as "battery voltage V1") is measured as the battery remaining power.

Subsequently, the battery-remaining-power measuring unit 15 transmits the battery voltage V1 to the safety determining unit 16 as battery remaining power information. The safety determining unit 16 calculates a difference Vd1 between battery remaining power at a certain measurement point (time) and a known battery remaining power characteristic (S3) and performs abnormality determination for the battery 14 based on the difference Vd1. The known battery remaining power characteristic may be stored in, for example, the storing unit 17 in the safety control unit 12. In this embodiment, as the known battery remaining power characteristic, a battery voltage with respect to an elapsed time at the time when electric power is supplied from the battery 14 (or another battery with the same specifications) in a full charge state to the electric actuating unit 11, the safety control unit 12, and the car speed detection device 13 at power failure is used.

Figure 4:
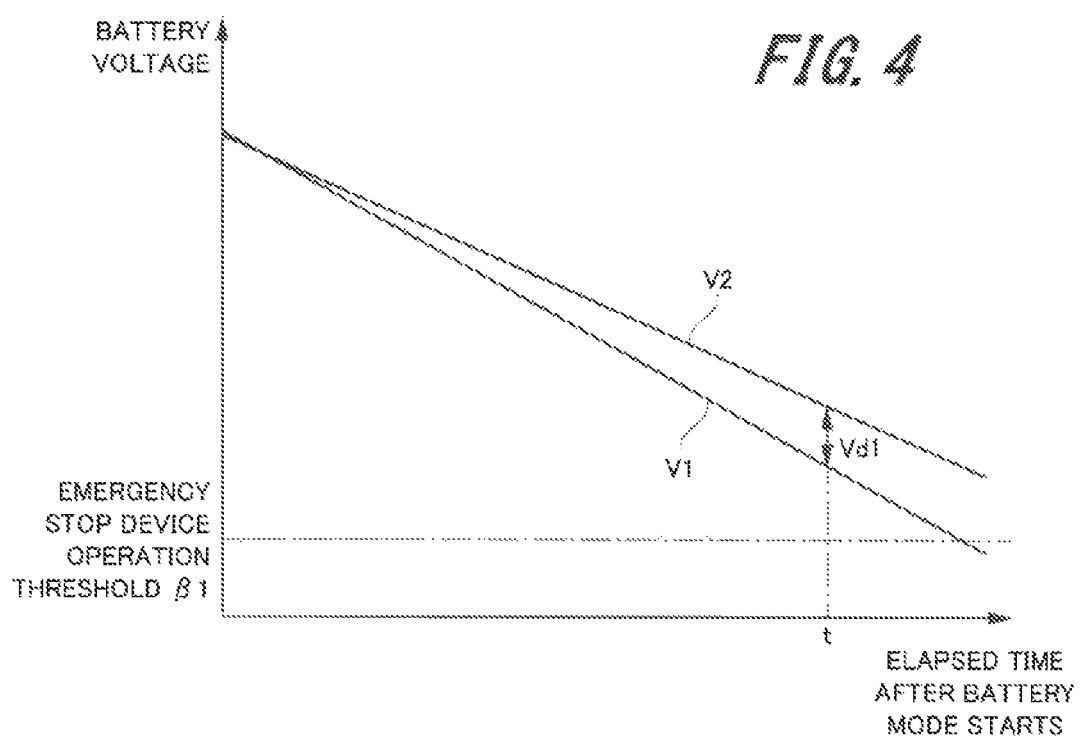
FIG. 4 is a transition diagram of battery remaining power for explaining abnormality determination for a battery according to the first embodiment of the present invention.

FIG. 4 is a transition diagram of battery remaining power for explaining abnormality determination for the battery 14 based on the battery remaining power according to the first embodiment. The horizontal axis of FIG. 4 indicates an elapsed time after a battery mode starts and the vertical axis of FIG. 4 indicates a battery voltage. In FIG. 4, V1 represents an output value of a battery voltage measured by the battery-remaining-power measuring unit 15 and V2 represents the known battery remaining power characteristic.

If an abnormal state of the battery 14 assumed by the known battery remaining power characteristic V2 and an actual abnormal state are the same, the battery voltage V1 and the battery remaining power characteristic V2 decrease in the same tendency as time elapses. Therefore, the difference Vd1 between the battery voltage V1 and the battery remaining power characteristic V2 is considered to be substantially fixed (for example, a small value close to zero) irrespective of time elapse (time t).

Consequently, the safety determining unit 16 compares the difference Vd1 with a certain predetermined battery abnormality determination threshold α1 (S4) and, when Vd1>α1, determines that abnormality has occurred in the battery 14 (YES in S4). When determining that the abnormality has occurred in the battery 14, the safety determining unit 16 gives an operation command for the emergency stop device 10 to the electric actuating unit 11 (S5).

The electric actuating unit 11 receives the operation command signal from the safety determining unit 16 and actuates the emergency stop device 10. Thereafter, when detecting that the braking operation of the emergency stop device 10 is completed, the electric actuating unit 11 transmits an operation completion signal of the emergency stop device 10 to the safety determining unit 16. A mechanical switch may be attached to the emergency stop device 10 to obtain the operation completion signal of the emergency stop device 10 from the mechanical switch. Alternatively, a mechanical switch may be attached to the electric actuating unit 11 to obtain a signal from the mechanical switch and indirectly determine the operation completion of the emergency stop device 10.

Subsequently, after receiving the operation completion signal of the emergency stop device 10, the safety determining unit 16 stores the automatic release prohibition information of the emergency stop device 10 in the storing unit 17 (S6). The safety determining unit 16 stores, in the storing unit 17, the same information as the operation command signal of the emergency stop device 10 and the operation completion signal of the emergency stop device 10 transmitted to the electric actuating unit 11. After the processing in step S6, the safety determining unit 16 ends the processing at the battery mode time.

Note that, when storing the automatic release prohibition information of the emergency stop device 10 in the storing unit 17, the safety determining unit 16 may transmit the same information to the monitoring unit 18 and request attendance of an operator to the external control center.

In this way, after the commercial power supply abnormality occurrence, when the difference between the measured battery remaining power and the known battery remaining power characteristic exceeds the predetermined determination threshold, the safety determining unit 16 outputs the operation command for the emergency stop device 10 to the electric actuating unit 11 and stores the automatic release prohibition information in the storing unit 17. According to the processing explained above, it is possible to cause the emergency stop device 10 to quickly operate and stop the car 1 at the time of commercial power supply abnormality and battery abnormality and, even at the commercial power supply restoration time, continue to maintain a stopped state of the car 1 unless the battery abnormality is solved.

Subsequently, operation performed when the battery voltage V1 continues to decrease while the difference Vd1 between the measured battery voltage V1 and the known battery remaining power characteristic V2 keeps the predetermined battery abnormality determination threshold α1 or less (NO in S4) is explained.

When time elapses without the commercial power supply being restored, the battery remaining power (the battery voltage V1) continues to decrease. Therefore, the safety determining unit 16 compares the battery voltage V1 with a certain threshold β1 (S7). The threshold β1 is an emergency stop device operation threshold (hereinafter abbreviated as "operation threshold"). The operation threshold β1 is set to be equal to or larger than a value for enabling the electric actuating unit 11 to operate the emergency stop device 10 and enabling the safety control unit 12 and the car speed detection device 13 to operate for a fixed time. If the battery voltage V1 is equal to or larger than the operation threshold β1, minimum electric power necessary for the operation of the electric actuating unit 11, the safety control unit 12, and the car speed detection device 13 is secured.

When the battery voltage V1 is equal to or larger than the operation threshold β1 (NO in S7), the safety determining unit 16 returns to processing in step S2, measures the battery voltage V1 again, and carries out the processing in step S3 and subsequent steps as appropriate. On the other hand, when the battery voltage V1 is smaller than the operation threshold 131 (YES in S7), the safety determining unit 16 gives an operation command for the emergency stop device 10 to the electric actuating unit 11 (S8).

When detecting that the operation of the emergency stop device 10 is completed, the electric actuating unit 11 transmits an operation completion signal of the emergency stop device 10 to the safety determining unit 16. After receiving the operation completion signal of the emergency stop device 10, the safety determining unit 16 stores the automatic release permission information of the emergency stop device 10 in the storing unit 17 (S9). The safety determining unit 16 stores, in the storing unit 17, the same information as the operation command signal of the emergency stop device 10 and the operation completion signal of the emergency stop device 10 transmitted to the electric actuating unit 11. After the processing in step S9, the safety determining unit 16 ends the processing at the battery mode time.

Note that, when storing the automatic release permission information of the emergency stop device 10 in the storing unit 17, the safety determining unit 16 may transmit the same information to the monitoring unit 18 and communicate unnecessity of attendance of the operator to the external control center.

According to the processing explained above, when the commercial power supply abnormality continues and the battery remaining power decreases to less than the operation threshold 131, it is possible to cause the emergency stop device 10 to operate to stop the car 1 in advance and store the automatic release permission information for automatically releasing the emergency stop device 10 at the commercial power supply restoration time in the storing unit 17 in advance.

At the commercial power supply restoration time, the safety determining unit 16 confirms the emergency stop device automatic release information in the storing unit 17, automatically releases the emergency stop device 10 if the automatic release permission information is stored, and shifts to a normal car traveling state (normal operation). Note that, when performing automatic release of the emergency stop device 10, the safety determining unit 16 desirably confirms the remaining power of the battery 14 using the battery-remaining-power measuring unit 15. After confirming that the remaining power equal to or more than the electric power required when the electric actuating unit 11 causes the emergency stop device 10 to operate (for example, equal to or more than the operation threshold 131) is in the battery 14, the safety determining unit 16 carries out the automatic release of the emergency stop device 10 by the electric actuating unit 11.

According to the first embodiment configured as explained above, the safety determining unit 16 can monitor battery abnormality making use of a decrease characteristic of the battery remaining power (the battery remaining power characteristic V2) after the commercial power supply abnormality occurrence. The safety determining unit 16 can determine, based on a monitoring result, during the commercial power supply abnormality occurrence, whether to automatically release the emergency stop device 10 at the commercial power supply restoration time or stay on standby until the operator arrives in a state in which the elevator 20 is stopped.

The safety determining unit 16 confirms the battery remaining power as time elapses after the commercial power supply abnormality occurrence and does not cause the emergency stop device to operate for a fixed time even after the commercial power supply abnormality occurrence. Consequently, the safety determining unit 16 can quickly shift to the normal car traveling state after the commercial power supply restoration in a short-time power failure or the like. Even when long-time commercial power supply abnormality occurs, the safety determining unit 16 can monitor whether the battery remaining power decreases in the same tendency as the known remaining power characteristic, estimate a cause of the power supply abnormality, and determine propriety of automatic return to the normal car traveling state after the commercial power supply restoration. Accordingly, it is possible to reduce an elevator unusable time after the commercial power supply restoration. Consequently, it is possible to reduce an attendance frequency of the operator.

2. Second Embodiment

As a second embodiment, an example is explained in which an elevator includes two batteries for supplying electric power to the elevator at commercial power supply interruption time.

Figure 5:
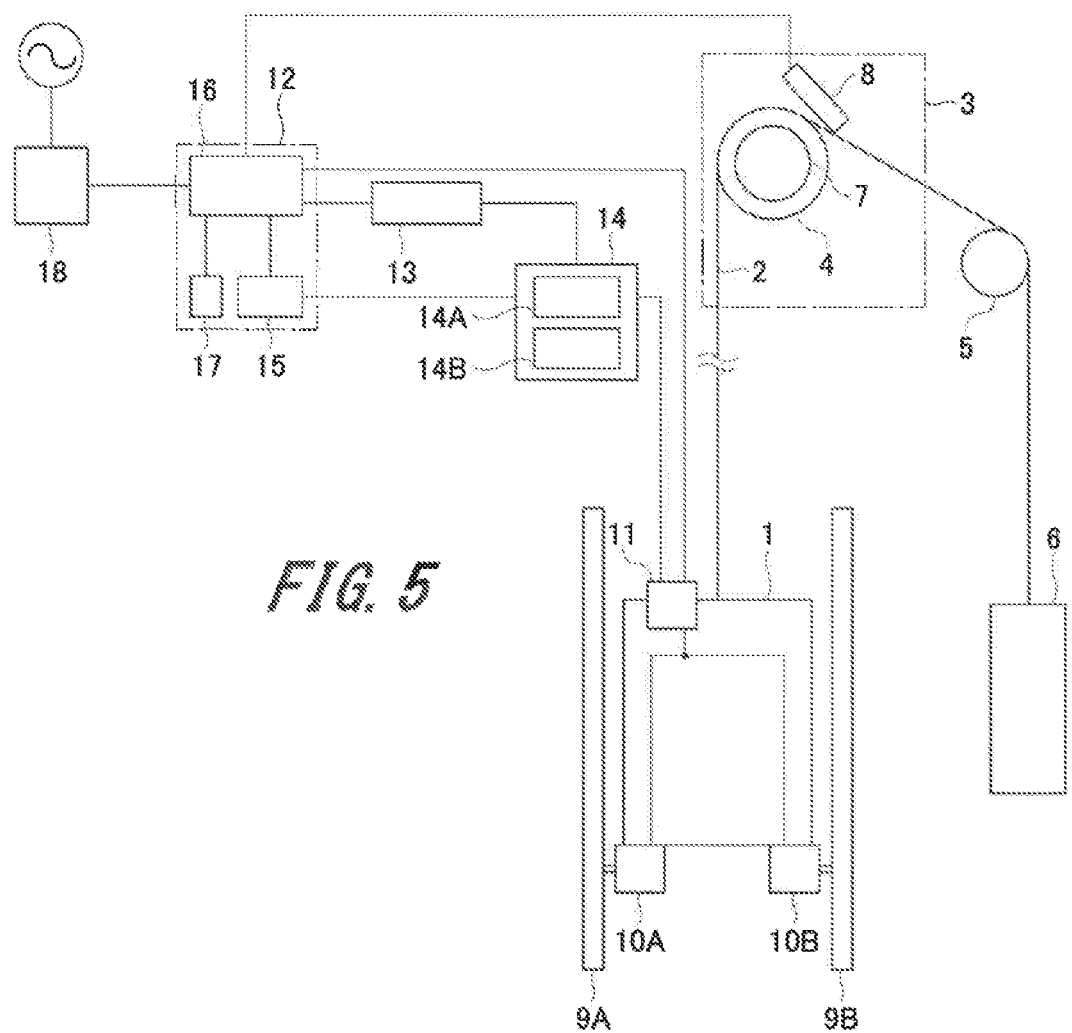
FIG. 5 is a schematic diagram illustrating an overall configuration example of an elevator according to a second embodiment of the present invention.

FIG. 5 is a schematic diagram illustrating an overall configuration example of an elevator 20A according to the second embodiment. The elevator 20A includes a battery 14A and a battery 14B as the battery 14. When abnormality has occurred in a commercial power supply of the elevator 20A, the battery 14A and the battery 14B each supply electric power to the electric actuating unit 11, the safety control unit 12, and the car speed detection device 13. The battery 14A and the battery 14B come into a charged state in a state in which the commercial power supply is not interrupted. Battery capacities of the battery 14A and the battery 14B at full charge time are equal. The other components are the same as the components in the first embodiment.

When the commercial power supply supplied to the elevator 20A is interrupted by some abnormality, the power supply by the battery 14 (the batteries 14A and 14B) is started. At this time, the safety control unit 12 detects that the electric power is supplied from the battery 14 and transitions from the normal mode to the battery mode. When transitioning to the battery mode, the elevator 20A performs the closest floor landing operation. In the following explanation, the operation of the emergency stop device 10 after the car 1 pauses on the closest floor in the battery mode is explained.

Figure 6:
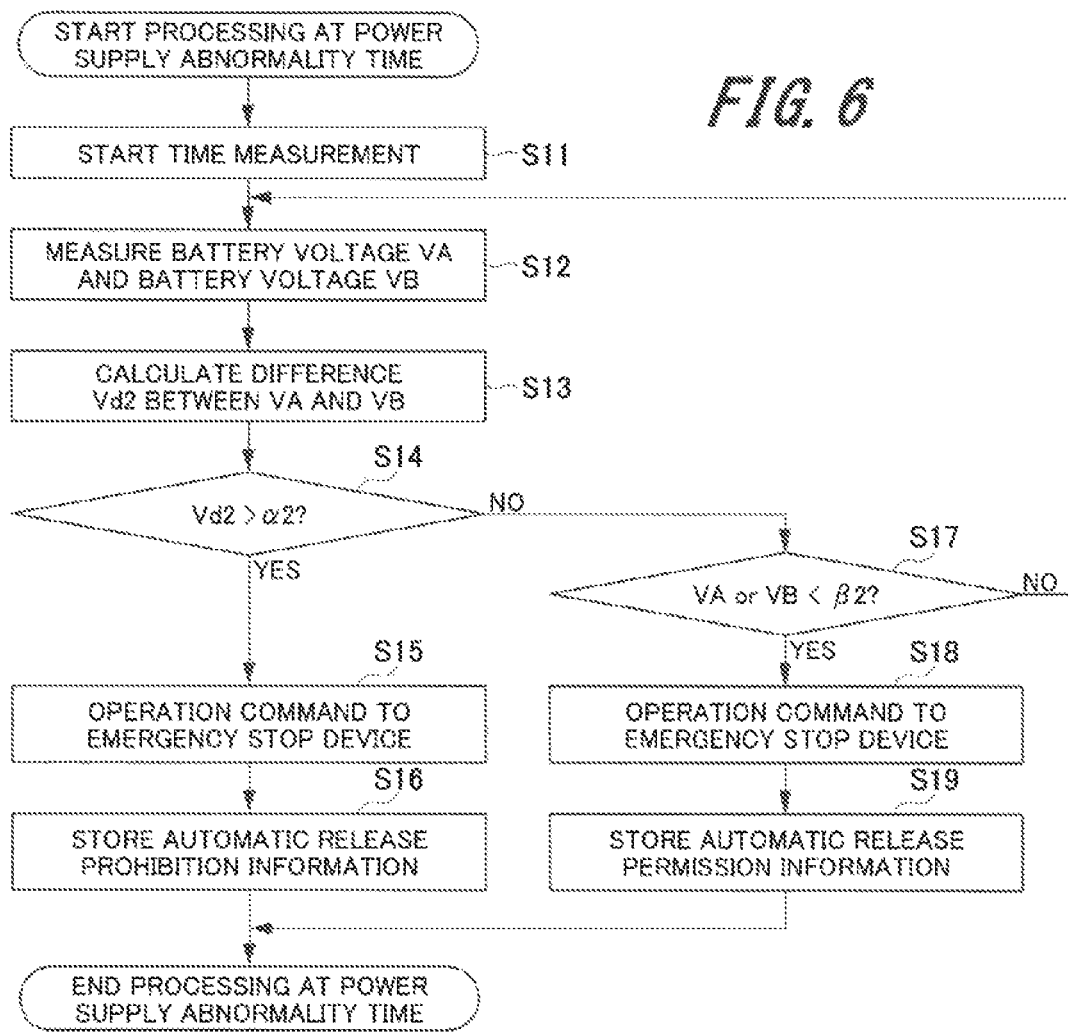
FIG. 6 is a flowchart for explaining the operation of an emergency stop device at power supply abnormality time according to the second embodiment of the present invention.

FIG. 6 is a flowchart for explaining the operation of the emergency stop device 10 at power supply abnormality time according to the second embodiment. Processing in steps S11, S15 to S16, and S18 to S19 in FIG. 6 is the same as the processing in steps S1, S5 to S6, and S8 to S9 in FIG. 3.

When transitioning to the battery mode, the safety control unit 12 starts measurement of an elapsed time after the battery mode transition (S11). During the battery mode, the battery-remaining-power measuring unit 15 measures remaining powers of the battery 14A and the battery 14B at every fixed period (S12). In this embodiment, as the battery remaining powers, a terminal voltage of the battery 14A (hereinafter referred to as "battery voltage VA") and a terminal voltage of the battery 14B (hereinafter referred to as "battery voltage VB" are measured.

Subsequently, the battery-remaining-power measuring unit 15 transmits the battery voltages VA and VB to the safety determining unit 16 as battery remaining power information. The safety determining unit 16 calculates a difference Vd2 between the battery voltage VA and the battery voltage VB at a certain measurement point (time) (S13) and performs abnormality determination for the battery 14 (the battery 14A and the battery 14B) based on the difference Vd2.

Figure 7:
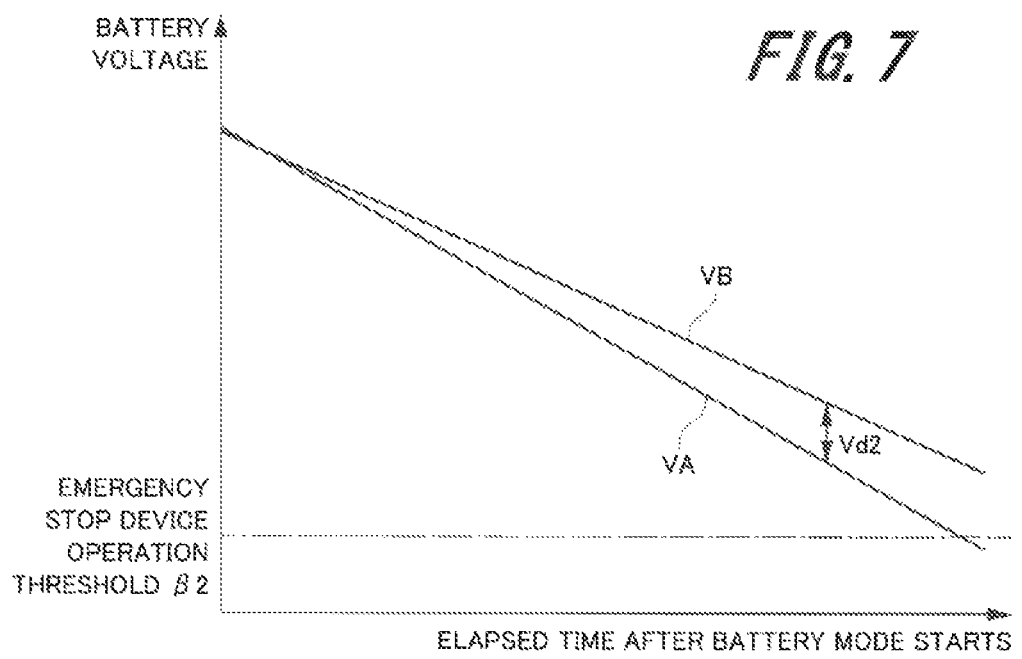
FIG. 7 is a transition diagram of battery remaining power for explaining abnormality determination for a battery according to the second embodiment of the present invention.

FIG. 7 is a transition diagram of battery remaining power for explaining abnormality determination for the battery 14 according to the second embodiment. The horizontal axis of FIG. 7 indicates an elapsed time after a battery mode starts and the vertical axis of FIG. 7 indicates a battery voltage. In FIG. 7, VA represents a battery voltage of the battery 14A measured by the battery-remaining-power measuring unit 15 and VB indicates a battery voltage of the battery 14B measured by the battery-remaining-power measuring unit 15.

If the battery 14A and the battery 14B are normal each other, the battery voltage VA and the battery voltage VB decrease in the same tendency as time elapses. Therefore, the difference Vd2 between the battery voltage VA and the battery voltage VB is considered to be substantially fixed (for example, a small value close to zero) irrespective of time elapse (time t).

Accordingly, the safety determining unit 16 compares the difference Vd2 with a certain predetermined battery abnormality determination threshold $\alpha2$ (S14) and, when $Vd2>\alpha2$, determines that abnormality has occurred in the battery 14 (at least one of the battery 14A or the battery 14B) (YES in S14).

Note that, a method of comparing the battery remaining powers is not limited to calculating a difference between the battery remaining powers (in this embodiment, the battery voltages) and may be comparing the battery remaining powers using, for example, a difference between change rates (the battery remaining powers/time) at the time when the battery remaining powers decrease. When determining that abnormality has occurred in the battery 14, the safety determining unit 16 gives an operation command for the emergency stop device 10 to the electric actuating unit 11 (S15).

The electric actuating unit 11 receives the operation command signal from the safety determining unit 16 and actuates the emergency stop device 10. Thereafter, when detecting that the braking operation of the emergency stop device 10 is completed, the electric actuating unit 11 transmits an operation completion signal of the emergency stop device 10 to the safety determining unit 16. After receiving the operation completion signal of the emergency stop device 10, the safety determining unit 16 stores automatic release prohibition information of the emergency stop device 10 in the storing unit 17 (S16). The safety determining unit 16 stores, in the storing unit 17, the same information as the operation command signal of the emergency stop device 10 and the operation completion signal of the emergency stop device 10 transmitted to the electric actuating unit 11. After the processing in step S16, the safety determining unit 16 ends the processing at the battery mode time.

Subsequently, operation performed when the battery voltage VA and the battery voltage VB continue to decrease while the difference Vd2 between the measured battery voltage VA and the measured battery voltage VB keeps the predetermined battery abnormality determined threshold $\alpha2$ or less (NO in S14) is explained.

When time elapses without the commercial power supply being restored, the battery remaining powers (the battery voltages VA and VB) continue to decrease. Therefore, the safety determining unit 16 compares the battery voltages VA and VB with a certain threshold $\beta2$ (S17). The threshold $\beta2$ is an emergency stop device operation threshold (hereinafter abbreviated as "operation threshold"). The operation threshold $\beta2$ is set to be equal to or larger than a value for enabling the electric actuating unit 11 to operate the emergency stop device 10 and enabling the safety control unit 12 and the car speed detection device 13 to operate for a fixed time.

When the battery voltage VA and the battery voltage VB are equal to or larger than the operation threshold $\beta2$ (NO in S17), the safety determining unit 16 returns to the processing in step S12, measures the battery voltages VA and VB again, and carries out the processing in step S13 and subsequent steps as appropriate. On the other hand, when the battery voltage VA or the battery voltage VB is smaller than the operation threshold $\beta2$ (YES in S17), the safety determining unit 16 gives an operation command for the emergency stop device 10 to the electric actuating unit 11 (S18).

When detecting that the operation of the emergency stop device 10 is completed, the electric actuating unit 11 transmits an operation completion signal of the emergency stop device 10 to the safety determining unit 16. After receiving the operation completion signal of the emergency stop device 10, the safety determining unit 16 stores automatic release permission information of the emergency stop device 10 in the storing unit 17 (S19). The safety determining unit 16 stores, in the storing unit 17, the same information as the operation command signal of the emergency stop device 10 and the operation completion signal of the emergency stop device 10 transmitted to the electric actuating unit 11. After the processing in step S19, the safety determining unit 16 ends the processing at the battery mode time.

At the commercial power supply restoration time, the safety determining unit 16 confirms the emergency stop device automatic release information in the storing unit 17, releases the emergency stop device 10 if the automatic release permission information of the emergency stop device 10 is stored, and shifts to the normal car traveling state.

According to the second embodiment configured as explained above, it is possible to monitor battery abnormality without making use of the known battery remaining power decrease characteristic used in the first embodiment by measuring the remaining powers (the battery voltages VA and VB) of the two batteries after the commercial power supply abnormality occurrence and comparing the remaining powers. Since an actual battery remaining power decrease characteristic changes depending on battery deterioration or an abnormal cause, it is possible to perform battery monitoring with high reliability by comparing the measured two battery remaining powers. Therefore, in this embodiment, compared with the first embodiment, it is possible to determine propriety of the emergency stop device automatic release with higher accuracy, reduce the elevator unusable time after the commercial power supply restoration, and reduce the attendance frequency of the operator.

3. Third Embodiment

As a third embodiment, and example is explained in which an elevator includes three batteries for supplying electric power to the elevator at commercial power supply interruption time. The number of batteries used as a backup power supply at the commercial power supply interruption time may be four or more.

Figure 8:
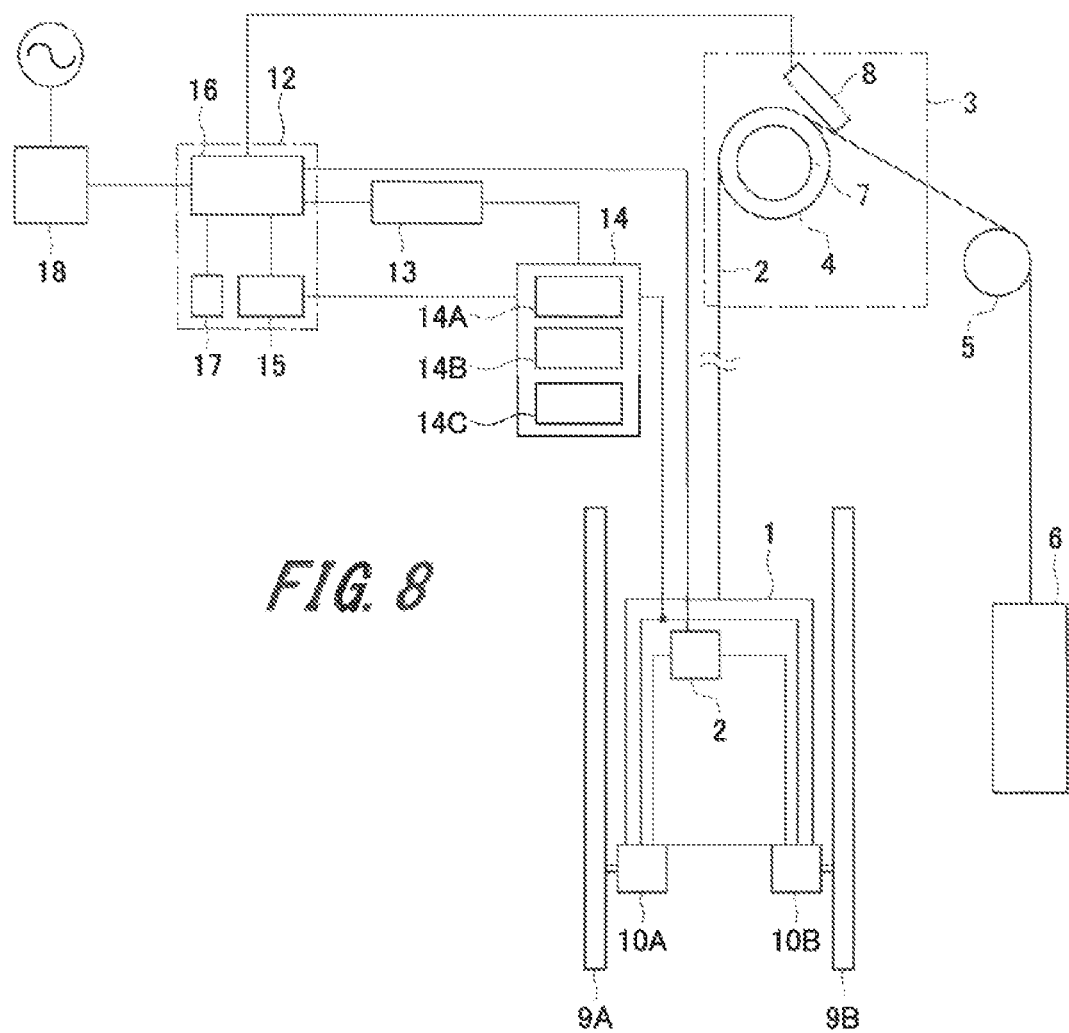
FIG. 8 is a schematic diagram illustrating an overall configuration example of an elevator according to a third embodiment of the present invention.

FIG. 8 is a schematic diagram illustrating an overall configuration example of an elevator 20B according to the third embodiment. The elevator 20B includes the battery 14A, the battery 14B, and a battery 14C as the battery 14. When abnormality has occurred in a commercial power supply of the elevator 20B, the battery 14A, the battery 14B, and the battery 14C each supply electric powers to the electric actuating unit 11, the safety control unit 12, and the car speed detection device 13. The batteries 14A to 14C are in a charged state in a state in which the commercial power supply is not interrupted. Battery capacities of the battery 14A, the battery 14B, and the battery 14C at full charge time are equal. The other components are the same as the components in the first embodiment.

When the commercial power supply supplied to the elevator 20B is interrupted because of some abnormality, power supply by the battery 14 (the batteries 14A to 14C) starts. At this time, the safety control unit 12 detects that the electric power is supplied from the battery 14 and transitions from the normal mode to the battery mode. When transitioning to the battery mode, the elevator 20B performs the closest floor landing operation. In the following explanation, the operation of the emergency stop device 10 after the car 1 pauses on the closest floor in the battery mode is explained.

FIG. 9 is a flowchart for explaining the operation of the emergency stop device 10 at power supply abnormality time according to the third embodiment. Processing in steps S21, S28 to S29, and S32 to S33 in FIG. 9 is the same as the processing in steps S1, S5 to S6, and S8 to S9 in FIG. 3.

When transitioning to the battery mode, the safety control unit 12 starts measurement of an elapsed time after the battery mode transition (S21). During the battery mode, the battery-remaining-power measuring unit 15 measures remaining powers of the battery 14A, the battery 14B, and the battery 14C at every fixed period (S22). In this embodiment, as battery remaining powers, the battery-remaining-power measuring unit 15 measures a terminal voltage of the battery 14A (the battery voltage VA), a terminal voltage of the battery 14B (the battery voltage VB), and a terminal voltage of the battery 14C (a battery voltage VC).

Subsequently, the battery-remaining-power measuring unit 15 transmits the battery voltage VA, the battery voltage VB, and the battery voltage VC to the safety determining unit 16 as battery remaining power information. The safety determining unit 16 calculates an average Vave of the battery voltage VA, the battery voltage VB, and the battery voltage VC at a certain measurement point (time) (S23). The safety determining unit 16 calculates a difference VdA between the average Vave of the battery voltages VA to VC and the battery voltage VA, a difference VdB between the average Vave of the battery voltages VA to VC and the battery voltage VB, and a difference VdC between the average Vave of the battery voltages VA to VC and the battery voltage VC (S24).

FIG. 10 is a transition diagram of battery remaining power for explaining abnormality detection for a battery according to the third embodiment. The horizontal axis of FIG. 10 indicates an elapsed time after a battery mode starts and the vertical axis of FIG. 10 indicates a battery voltage. In FIG. 10, VA represents a battery voltage of the battery 14A measured by the battery-remaining-power measuring unit 15, VB represents a battery voltage of the battery 14B measured by the battery-remaining-power measuring unit 15, and VC represents a battery voltage of the battery 14C measured by the battery-remaining-power measuring unit 15.

If the battery 14A, the battery 14B, and the battery 14C are normal one another, the battery voltage VA, the battery voltage VB, and the battery voltage VC decrease in the same tendency as time elapses. Therefore, the difference VdA, the difference VdB, and the difference VdC between the battery voltage VA, the battery voltage VB, and the battery voltage VC and the average Vave are considered to be substantially fixed (for example, a small value close to zero) irrespective of the time elapse.

Accordingly, the safety determining unit 16 compares the difference VdA, the difference VdB, and the difference VdC with a certain predetermined battery abnormality determination threshold $\alpha 3$ and determines a magnitude relation between the difference VdA, the difference VdB, and the difference VdC and the threshold $\alpha 3$ (S25). When at least one of the difference VdA, the difference VdB, and the difference VdC is larger than the threshold $\alpha 3$ (YES in S25), the safety determining unit 16 determines that abnormality has occurred in the battery 14.

Subsequently, in order to specify a battery in which abnormality has occurred, the safety determining unit 16 determines whether two or more of the difference VdA, the difference VdB, and the difference VdC are larger than the threshold $\alpha 3$ (S26). When only any one of the difference VdA, the difference VdB, and the difference VdC is larger than the threshold $\alpha 3$ (NO in S26), the safety determining unit 16 determines that abnormality has occurred in a battery in which a difference larger than the threshold $\alpha 3$ is measured. The safety determining unit 16 then stores, in the storing unit 17, information indicating the battery in which the difference larger than the threshold $\alpha 3$ is measured (S27) and gives an operation command for the emergency stop device 10 to the electric actuating unit 11 (S28).

When detecting that the operation of the emergency stop device 10 is completed, the electric actuating unit 11 transmits an operation completion signal of the emergency stop device 10 to the safety determining unit 16. After receiving the operation completion signal of the emergency stop device 10, the safety determining unit 16 stores, in the storing unit 17, the automatic release prohibition information of the emergency stop device 10 (S29). The safety determining unit 16 stores, in the storing unit 17, the same information as the operation command signal of the emergency stop device 10 and the operation completion signal of the emergency stop device 10 transmitted to the electric actuating unit 11.

A method of comparing the battery remaining powers is not limited to calculating differences between the battery remaining powers (in this embodiment, the battery voltages) and an average of the battery remaining powers and may be calculating, for example, differences among change rates (the battery remaining powers/time) at which the battery remaining powers decrease and comparing an average of the battery remaining power change rates with respective battery remaining power averages.

Note that, by electrically disconnecting the abnormal battery, an automatic release permission state (a car traveling state) of the emergency stop device 10 may be maintained by only the remaining batteries. The monitoring unit 18 may communicate to the control center that battery replacement is necessary at the next inspection time.

On the other hand, when two or more of the difference VdA, the difference VdB, and the difference VdC are larger than the threshold $\alpha 3$ (YES in S26), the safety determining unit 16 determines that abnormality has occurred in at least two or more batteries. In this case, the safety determining unit 16 stores, in the storing unit 17, information indicating that abnormality has occurred in a plurality of batteries (S30) and gives an operation command for the emergency stop device 10 to the electric actuating unit 11 (S28). After the operation of the emergency stop device 10 is completed, the safety determining unit 16 stores the automatic release prohibition information of the emergency stop device 10 in the storing unit 17 (S29). After the processing in step S29, the safety determining unit 16 ends the processing at the battery mode time.

Subsequently, operation performed when the battery voltage VA, the battery voltage VB, and the battery voltage VC continue to decrease while the difference VdA, the difference VdB, and the difference VdC between the battery voltage VA, the battery voltage VB, and the battery voltage VC and the average Vave of the battery voltages keep the predetermined battery abnormality determination threshold α3 or less (NO in S25) is explained.

When time elapses without the commercial power supply being restored, the battery remaining powers (the battery voltages VA to VC) continue to decrease. Therefore, the safety determining unit 16 compares the difference VdA, the difference VdB, and the difference VdC with a certain threshold β3 and determines a magnitude relation (S31). The threshold β3 is an emergency stop device operation threshold (hereinafter abbreviated as "operation threshold"). The operation threshold β3 is set to be equal to or larger than a value for enabling the electric actuating unit 11 to operate the emergency stop device 10 and enabling the safety control unit 12 and the car speed detection device 13 to operate for a fixed time.

When the difference VdA, the difference VdB, and the difference VdC are equal to or larger than the operation threshold β3 (NO in S31), the safety determining unit 16 returns to the processing in step S22, measures the battery voltages VA to VC again, and carries out the processing in step S23 and subsequent steps as appropriate. On the other hand, when at least one of the difference VdA, the difference VdB, and the difference VdC is smaller than the operation threshold β3 (YES in S31), the safety determining unit 16 gives an operation command for the emergency stop device 10 to the electric actuating unit 11 (S32).

When detecting that the operation of the emergency stop device 10 is completed, the electric actuating unit 11 transmits an operation completion signal of the emergency stop device 10 to the safety determining unit 16. After receiving the operation completion signal of the emergency stop device 10, the safety determining unit 16 stores the automatic release permission information of the emergency stop device 10 in the storing unit 17 (S33). The safety determining unit 16 stores, in the storing unit 17, the same information as the operation command signal of the emergency stop device 10 and the operation completion signal of the emergency stop device 10 transmitted to the electric actuating unit 11.

At the commercial power supply restoration time, the safety determining unit 16 confirms the emergency stop device automatic release information in the storing unit 17, releases the emergency stop device 10 if the automatic release permission information of the emergency stop device 10 is stored, and shifts to the normal car traveling state.

According to the third embodiment configured as explained above, it is possible to perform propriety determination for emergency stop device automatic release with high reliability by measuring the remaining powers (the battery voltages VA to VC) of the three or more batteries after the commercial power supply abnormality occurrence and comparing the remaining powers of the batteries with the average of the power remaining powers of the batteries. Since the battery in which abnormality has occurred can be specified, it is possible to reduce an unusable time after power supply restoration of the elevator and reduce an attendance frequency of the operator.

The present invention is not limited to the embodiments explained above. It goes without saying that the present invention can take other various applications and modifications without departing from the gist of the present invention described in claims.

For example, the embodiments explained above are embodiments in which the configurations of the elevators are explained in detail and specifically in order to clearly explain the present invention and are not always limited to embodiments including all of the explained constituent elements. A part of the configuration of a certain embodiment can be replaced with a constituent element of another embodiment. A constituent element of another embodiment can be added to the configuration of a certain embodiment. Other constituent elements can be added to, deleted from, or replaced with a part of the configurations of the embodiments.

A part or all of the components, the functions, the processing units, and the like explained above may be realized by hardware by, for example, being designed by an integrated circuit.

REFERENCE SIGNS LIST

1 car
2 main rope
3 winding machine
4 sheave
5 pulley
6 balance weight
7 motor
8 winding machine brake
9A, 9B guiderail
10A, 10B emergency stop device
11 electric actuating unit
12 safety control unit
13 car speed detection device
14, 14A, 14B, 14C battery
15 battery-remaining-power measuring unit
16 safety determining unit
17 storing unit
18 monitoring unit
20, 20A, 20B elevator

The invention claimed is:
1. An elevator comprising:
a car lifted and lowered along a guiderail on an inside of a shaft;
a car speed detection device that measures moving speed of the car;
an emergency braking device provided in the car and including a braking mechanism configured to be capable of coming into press contact with the guiderail and emergently stopping the car when the moving speed of the car exceeds a threshold;
an electric actuating unit that actuates the emergency braking device using electricity according to an operation command;

a battery that supplies electric power when supply of commercial power supply to the elevator is interrupted; and a safety control unit that monitors abnormality of the elevator and controls operation of the electric actuating unit, wherein the safety control unit measures remaining power of the battery when the supply of the commercial power supply is interrupted and the electric power is supplied from the battery, determines, based on a change in the remaining power of the battery over time, an operation propriety of the emergency braking device at a commercial power supply restoration time at which the commercial power supply is restored, the operation propriety indicating whether to release the emergency braking device, and controls operation of the electric actuating unit at the commercial power supply restoration time based on content of a determination of the operation propriety, the safety control unit includes:

a battery-remaining-power measuring unit that measures the remaining power of the battery as time elapses when the electric power is supplied from the battery;

a safety determining unit that performs abnormality determination for the elevator and controls the electric actuating unit based a determination result; and a storing unit that stores determination content of the operation propriety at the commercial power supply restoration time for the emergency braking device, and the safety determining unit determines, based on transition of the remaining power of the battery measured by the battery-remaining-power measuring unit, whether abnormality is present in the battery, when determining that abnormality is present in the battery, stores in the storing unit, as determination content of the operation propriety, automatic release prohibition information for prohibiting automatic release for releasing a state in which the braking mechanism of the emergency braking device is in press contact with the guiderail at the power supply restoration time, when determining that abnormality is absent in the battery, stores in the storing unit, as the determination content of the operation propriety, automatic release permission information for permitting the automatic release for releasing the state in which the braking mechanism of the emergency braking device is in press contact with the guiderail at the commercial power supply restoration time, and controls, at the commercial power supply restoration time, the electric actuating unit based on the automatic release prohibition information or the automatic release permission information stored in the storing unit.

2. The elevator according to claim 1, wherein, when a difference between the measured remaining power of the battery and a known battery remaining power characteristic exceeds a predetermined determination threshold, the safety determining unit outputs an operation command for the emergency braking device to the electric actuating unit and stores the automatic release prohibition information in the storing unit.

3. The elevator according to claim 2, wherein when the difference between the remaining power of the battery and the battery remaining power characteristic is equal to or smaller than the predetermined determination threshold and the remaining power of the battery is smaller than an operation threshold of a predetermined emergency braking device, the safety determining unit outputs the operation command for the emergency braking device to the electric actuating unit and stores the automatic release permission information in the storing unit after confirming that an operation completion signal is received from the electric actuating unit.

4. The elevator according to claim 3, wherein the operation threshold of the emergency braking device is set to be equal to or larger than a value for enabling the electric actuating unit to operate and enabling the safety control unit and the car speed detection device to operate for a fixed time.

5. The elevator according to claim 1, wherein the electric actuating unit operates before power supply of the battery to the car speed detection device and the safety control unit is interrupted.

6. The elevator according to claim 1, wherein the elevator includes two of the batteries, and when a difference between remaining powers of the two batteries measured after the supply of the commercial power supply to the elevator is interrupted exceeds a predetermined determination threshold, the safety determining unit outputs an operation command for the emergency braking device to the electric actuating unit and stores the automatic release prohibition information in the storing unit.

7. The elevator according to claim 1, wherein the elevator includes three or more of the batteries, and the safety determining unit calculates, using remaining powers of the three or more batteries measured after the supply of the commercial power supply to the elevator is interrupted, an average of the remaining powers of the batteries and, when at least one difference among differences between an average of the calculated remaining powers of the batteries and the remaining powers of the batteries exceeds a predetermined determination threshold, outputs an operation command for the emergency braking device to the electric actuating unit and stores the automatic release prohibition information in the storing unit.

8. The elevator according to claim 3, wherein, when confirming that the automatic release permission information is stored in the storing unit at the commercial power supply restoration time, the safety determining unit automatically releases the emergency braking device by the electric actuating unit and transitions to a normal car traveling state.

9. The elevator according to claim 8, wherein, when performing automatic release of the emergency braking device, the safety determining unit carries out the automatic release of the emergency braking device by the electric actuating unit after confirming that remaining power equal to or more than electric power required when the electric actuating unit operates is in the battery.

10. A control method for an elevator including: a car lifted and lowered along a guiderail on an inside of a shaft; a car speed detection device that measures moving speed of the car; an emergency braking device provided in the car and including a braking mechanism configured to be capable of coming into press contact with the guiderail and emergently stopping the car when the moving speed of the car exceeds a threshold; an electric actuating unit that actuates the emergency braking device using electricity according to an operation command; a battery that supplies electric power when supply of commercial power supply to the elevator is interrupted; and a safety control unit that monitors abnormality of the elevator and controls operation of the electric actuating unit, the control method comprising:

processing for measuring remaining power of the battery when the supply of the commercial power supply is interrupted and the electric power is supplied from the battery;

processing for determining, based on a change in the remaining power of the battery over time, an operation propriety of the emergency braking device at a commercial power supply restoration time at which the commercial power supply is restored, the operation propriety indicating whether to release the emergency braking device; and processing for controlling operation of the electric actuating unit at the commercial power supply restoration time based on content of a determination of the operation propriety;

wherein the safety control unit includes:

a battery-remaining-power measuring unit that measures the remaining power of the battery as time elapses when the electric power is supplied from the battery, a safety determining unit that performs abnormality determination for the elevator and controls the electric actuating unit based a determination result, and a storing unit that stores determination content of the operation propriety at the commercial power supply restoration time for the emergency braking device; and wherein the safety determining unit determines, based on transition of the remaining power of the battery measured by the battery-remaining-power measuring unit, whether abnormality is present in the battery, when determining that abnormality is present in the battery, stores in the storing unit, as determination content of the operation propriety, automatic release prohibition information for prohibiting automatic release for releasing a state in which the braking mechanism of the emergency braking device is in press contact with the guiderail at the power supply restoration time, when determining that abnormality is absent in the battery, stores in the storing unit, as the determination content of the operation propriety, automatic release permission information for permitting the automatic release for releasing the state in which the braking mechanism of the emergency braking device is in press contact with the guiderail at the commercial power supply restoration time, and controls, at the commercial power supply restoration time, the electric actuating unit based on the automatic release prohibition information or the automatic release permission information stored in the storing unit.

* * * * *